United States Patent
Takagi (10) Patent No.: US 12,001,744 B2
(45) Date of Patent: Jun. 4, 2024

(54) CLOUD PRINT SYSTEM TO STORE A PRINT JOB RECEIVED FROM OTHER CLOUD PRINT SYSTEM AND TRANSMIT THE STORED PRINT JOB TO AN IMAGE FORMING APPARATUS AND CONTROL METHOD OF CLOUD PRINT SYSTEM

(71) Applicant: CANON KABUSHIKI KAISHA, Tokyo (JP)

(72) Inventor: Noriko Takagi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/891,196

(22) Filed: Aug. 19, 2022

(65) Prior Publication Data

US 2023/0077886 A1  Mar. 16, 2023

(30) Foreign Application Priority Data

Sep. 7, 2021 (JP) .................... 2021-145381

(51) Int. Cl.
G06F 3/12 (2006.01)

(52) U.S. Cl.
CPC .......... *G06F 3/1285* (2013.01); *G06F 3/1207* (2013.01); *G06F 3/1238* (2013.01); *G06F 3/1267* (2013.01); *G06F 3/1222* (2013.01)

(58) Field of Classification Search
None
See application file for complete search history.

(56) References Cited

U.S. PATENT DOCUMENTS

| | | | | |
|---|---|---|---|---|
| 9,311,037 | B2 * | 4/2016 | Kuribara | G06F 3/1288 |
| 2013/0083353 | A1 * | 4/2013 | Nishikawa | G06F 3/1206 |
| | | | | 358/1.15 |
| 2014/0036309 | A1 * | 2/2014 | Oguma | G06F 3/1288 |
| | | | | 358/1.15 |
| 2014/0366104 | A1 | 12/2014 | Nishida et al. | |
| 2016/0316100 | A1 * | 10/2016 | Hwang | G06F 3/1236 |
| 2016/0364192 | A1 * | 12/2016 | Fujii | H04N 1/00244 |
| 2018/0181352 | A1 * | 6/2018 | Saito | G06F 3/1288 |
| 2021/0165620 | A1 * | 6/2021 | Morita | G06F 21/33 |

FOREIGN PATENT DOCUMENTS

JP  2014235681 A  12/2014

* cited by examiner

*Primary Examiner* — Haris Sabah
(74) *Attorney, Agent, or Firm* — ROSSI, KIMMS & McDOWELL LLP (57) ABSTRACT

A cloud print system connected to an image forming apparatus via a network comprises one or more memories storing a set of instructions and one or more processors that execute the set of instructions to store a print job received from other cloud print system and information indicating the other cloud print system, transmit the stored print job to the image forming apparatus in response to a request from the image forming apparatus, receive information of a execution result of the transmitted print job from the image forming apparatus, and transmit the received information of the execution result to the other cloud print system by using the information indicating the other cloud print system.

4 Claims, 6 Drawing Sheets

CLOUD PRINT SYSTEM TO STORE A PRINT JOB RECEIVED FROM OTHER CLOUD PRINT SYSTEM AND TRANSMIT THE STORED PRINT JOB TO AN IMAGE FORMING APPARATUS AND CONTROL METHOD OF CLOUD PRINT SYSTEM

BACKGROUND OF THE INVENTION

Field of the Invention

The present disclosure relates to a cloud print system and a control method of the cloud print system.

Description of the Related Art

In recent years, a cloud print service that inputs a print job via a cloud and transmits the print job to an image forming apparatus has begun to spread. In a cloud print service, an administrator registers an image forming apparatus to a tenant of the cloud print service to which the administrator belongs. The administrator sets which users belonging to the tenant are allowed to use the image forming apparatus. Here, the tenant means one service system that a user deploys on the cloud, and has a storage area whose access is restricted as a user's exclusive use. For example, the tenant of the cloud print service used by a certain company A registers an employee working at the company A as a user, and registers and uses the image forming apparatus of the company A. Thus, when the user of the company A executes printing from the company terminal, the user can freely perform printing from any image forming apparatus of the company A.

For example, a company operating a shared office can use a cloud print service for holding a shared office tenant. As a result, printing by cloud print can be realized in the shared office in the same way as in company A. In this shared office, user management based on the shared office tenant may be performed to a company or an individual using the shared office, and guest printing function may be provided to the company or the individual with or without user management. The image forming apparatus for performing printing in the shared office is registered in and managed by the shared office tenant.

Here, guest printing refers to a scheme that allows printing without a user account. Specifically, in the guest printing, a print job is input from a client terminal such as a personal computer or a mobile terminal, a cloud print service issues a job code unique to the print job, and notifies the client terminal of the job code. When the user executes printing, the job code is input to the image forming apparatus to specify a target print job and execute printing.

On the other hand, due to the diversification of working styles, there is a demand that an employee of company A working in a shared office wants to print a document stored in a client terminal of the company by using an image forming apparatus installed in the shared office. To meet that demand, the cloud print service provides cross-tenant collaboration and enables the printing of documents on internal client terminals. For example, in order to exchange data between tenants, trust relationships are established for the collaboration.

Thus, the user of the company A can input a print job to the tenant of the company A from the client terminal in the company, and after moving to the shared office, designate and execute the print job by an image forming apparatus registered in the shared office tenant. At this time, in the cloud print service, the tenant of the company A transmits the print job to the associated share office tenant. Thus, since the print job can be stored on the shared office tenant, the user of the company A can execute printing by using the image forming apparatus in the shared office.

However, the user of company A does not necessarily have a user account for the shared office. Therefore, it is necessary to enable guest printing when printing in the shared office for the user who does not hold a user account for the shared office.

For example, in Japanese Patent Application Laid-Open No. 2014-235681, when a user transmits a mail to which a document to be printed is attached to a print server, the mail is transferred to the print server via the mail server. The print server inquires of an authentication server about a mail address of a transmission source, and checks whether there is a mail address corresponding to user information stored in the authentication server. If the corresponding mail address is not found, the print server issues a job code (PIN code) and notifies the mail transmitter of the job code in a form of a mail reply to enable guest printing.

Japanese Patent Application Laid-Open No. 2014-235681 discloses a method for realizing a guest printing in a system in which unified user management is performed, and the guest printing cannot be realized because the same job management as the aforementioned job management cannot be performed between tenants with different user managements (between the tenant of the company A and the shared office tenant).

Further, since the printing result cannot be shared between the tenant of the company A and the shared office tenant, the information of the printing result cannot be stored on the company A side. In other words, the tenant of the company A cannot manage the number of copies of the print job executed by the user, billing information, and the history of the print job, which is insufficient as the function provided by the cloud print service.

In addition, from the viewpoint of security, in order to correctly perform the above aggregation/management, the print result received by the tenant of the company A from the shared office tenant must not be values changed by spoofing, etc.

An object of the present disclosure is to enable a cloud print system to manage information of an execution result of a print job by transmitting the information of the execution result of the print job to other cloud print system.

SUMMARY OF THE INVENTION

According to an aspect of the present invention, a cloud print system connected to an image forming apparatus via a network comprises one or more memories storing a set of instructions; and one or more processors that execute the set of instructions to store a print job received from other cloud print system and information indicating the other cloud print system, transmit the stored print job to the image forming apparatus in response to a request from the image forming apparatus, receive information of a execution result of the transmitted print job from the image forming apparatus, and transmit the received information of the execution result to the other cloud print system by using the information indicating the other cloud print system.

Further features of the present invention will become apparent from the following description of exemplary embodiments with reference to the attached drawings.

DESCRIPTION OF THE EMBODIMENTS

First Embodiment

Figure 1:
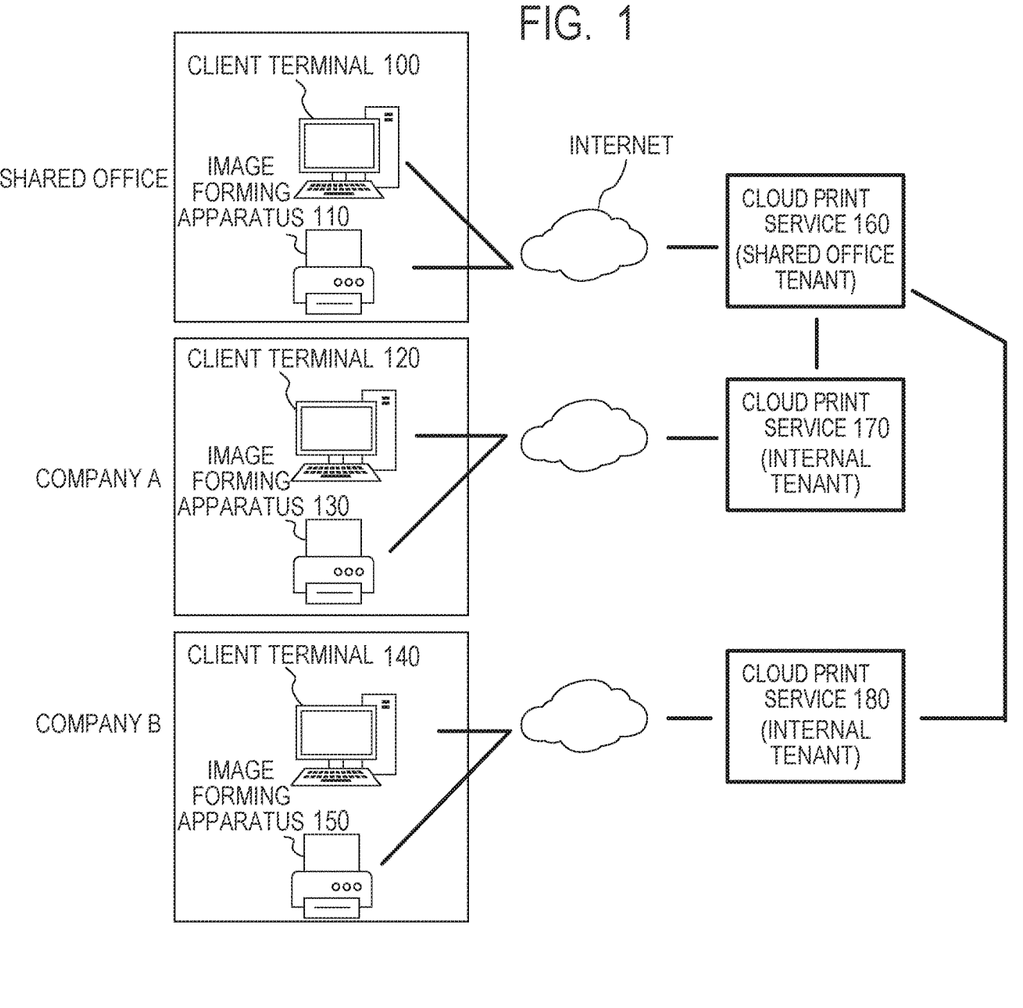
FIG. 1 illustrates an example of a configuration of a print system.

FIG. 1 illustrates a diagram of a configuration example of a print system according to a first embodiment. A client terminal 100 and an image forming apparatus 110 are installed in a shared office. A client terminal 120 and an image forming apparatus 130 are installed in a company A. A client terminal 140 and an image forming apparatus 150 are installed in a company B.

A cloud print service (hereinafter referred to as CPS) 160 is managed by an administrator of an operating company of the shared office, and a tenant allocated to this shared office is called a shared office tenant. A CPS 170 is managed by an administrator of the company A, and a tenant assigned here is called an internal tenant. In a CPS 180, a tenant managed by an administrator of the company B and assigned here is called an internal tenant.

The client terminal 100 is a client terminal that inputs a print job to the CPS 160. The client terminal 120 is a client terminal that inputs a print job to the CPS 170. The client terminal 140 is a client terminal that inputs a print job to the CPS 180.

The image forming apparatus 110 acquires a print job from the CPS 160 to execute printing based on the print job. The image forming apparatus 130 acquires a print job from the CPS 170 to execute printing based on the print job. The image forming apparatus 150 acquires a print job from the CPS 180 to execute printing based on the print job.

The CPS 160 is a cloud print system and is connected to the image forming apparatus 110 via a network. The CPS 170 is a cloud print system and is connected to the image forming apparatus 130 via a network. The CPS 180 is a cloud print system and is connected to the image forming apparatus 150 via a network.

The CPS 160 is a CPS that receives a print job from the client terminal 100 and obtains print jobs from external CPSs 170 and 180. The CPS 170 is a CPS that receives a print job from the client terminal 120 and transmits the print job to the CPS 160. The CPS 180 is a CPS that receives a print job from the client terminal 140 and transmits the print job to the CPS 160.

Each of the above components is communicatively connected by the network. The network may be, for example, a LAN or a WAN such as the Internet, a telephone line, a dedicated digital line, an ATM network, or the like. The network may be a communication network realized by a combination of these networks.

In the present embodiment, the CPS 160 is described as a role of a public print tenant, and CPSs 170 and 180 are described as roles of internal tenants. The CPSs 160, 170, and 180 are described as separate cloud print services. The CPS 160 may also serve as the CPSs 170 and 180. The CPSs 170 and 180 may also serve as the CPS 160. These CPSs may be a cloud print service composed of the same components.

Figure 2:
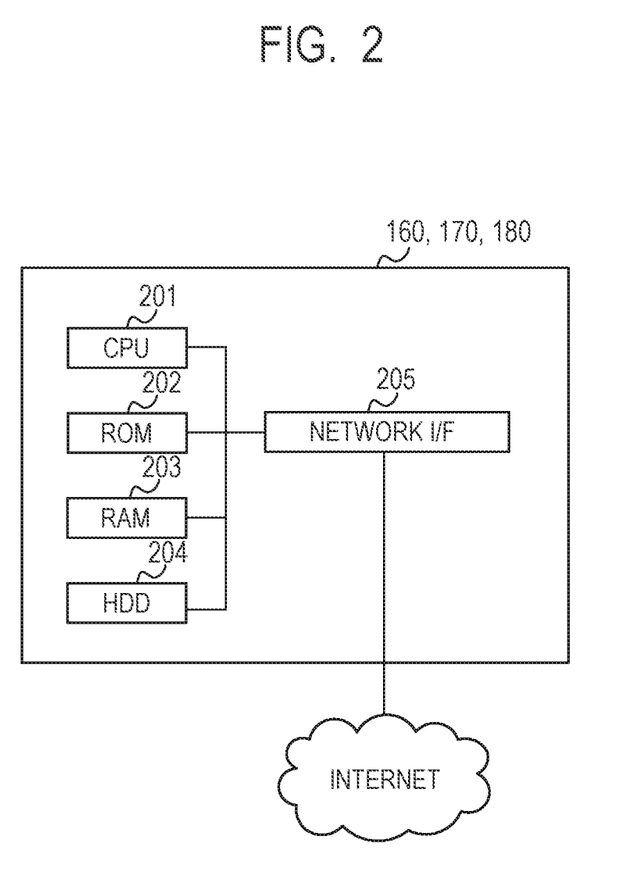
FIG. 2 illustrates a diagram of an example of a hardware configuration of a cloud print service.

FIG. 2 illustrates a diagram of a hardware configuration example of each of the CPSs 160, 170, and 180. Each of the CPSs 160, 170, and 180 includes a server computer in a data center on which a cloud service acting as the CPS is built. The client terminals 100, 120, and 140 and the image forming apparatuses 110, 130, and 150 have the same hardware configuration as the CPS 160, 170, and 180, respectively.

Each of the CPSs 160, 170, and 180 has a CPU 201, a ROM 202, a RAM 203, an HDD 204, and a network I/F 205. The CPU 201 reads a control program stored in the ROM 202 and executes the control program to control the overall operation of the CPS. The RAM 203 is used as a temporary storage area such as a main memory and a work area of the CPU 201. The HDD 204 is a mass storage unit for storing image data and various programs. The network I/F 205 is an interface for connecting the CPS 160, 170, or 180 to the Internet. Each of the CPSs 160, 170, and 180 receives a processing request from the client terminals 100, 120, and 140, the image forming apparatuses 110, 130, and 150, or other CPSs via the network I/F 205, performs various processes, and transmits and receives information.

Figure 3:
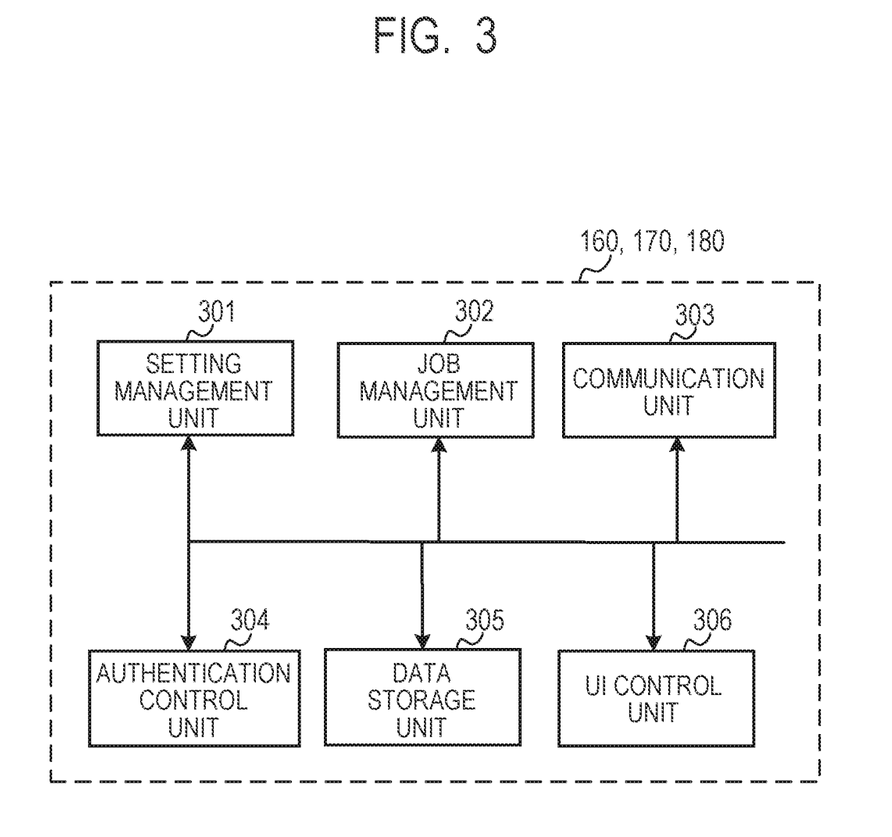
FIG. 3 illustrates a diagram of an example of a functional configuration of the cloud print service.

FIG. 3 illustrates a block diagram of a functional configuration example of each of the CPSs 160, 170, and 180. The functional configuration in FIG. 3 is realized by reading a program stored in the ROM 202 into the RAM 203 and executing the program by the CPU 201, for example.

Each of the CPSs 160, 170, and 180 has a setting management unit 301, a job management unit 302, a communication unit 303, an authentication control unit 304, a data storage unit 305, and a UI control unit 306.

The setting management unit 301 stores settings related to various functions of the CPS in respective storage devices such as the RAM 203 and the HDD 204, and reads them from the respective storage devices. Here, one of the settings is, for example, a URL of a tenant.

A job management unit 302 stores the print job and information related to the print job received from the client terminal or the external CPS in the data storage unit 305. The job management unit 302 issues a job code when receiving the print job. Further, when the job management unit 302 receives a print job request from the image forming apparatus designating the job code, the job management unit 302 acquires a corresponding print job from the data storage unit 305 to transmit the print job to the image forming apparatus via the communication unit 303.

The communication unit 303 communicates with, for example, the client terminal, the image forming apparatus, or the external CPS, and receives each processing request and transmits processing results.

The authentication control unit 304 performs user management. The authentication control unit 304 stores the user information added by the administrator of the internal tenant or the public print tenant in the data storage unit 305 or a user management exclusive database (not shown). The authentication control unit 304 may cooperate with an external authentication service.

The data storage unit 305 stores data in response to a request from the job management unit 302 or the authentication control unit 304.

Figure 5:
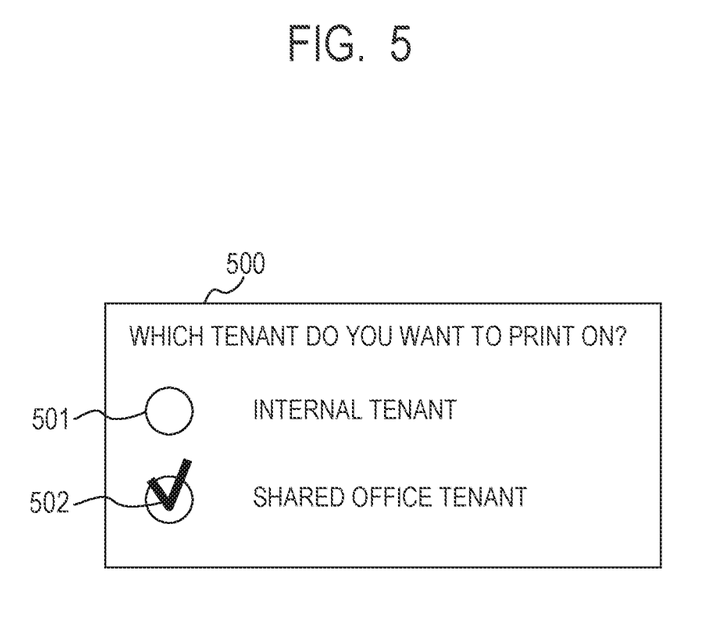
FIG. 5 illustrates an example of a page screen of a tenant web.

The UI control unit 306 generates and transmits a screen in response to a request from the client terminal or the image forming apparatus. For example, the UI control unit 306 generates the screen as shown in FIG. 5 in response to a request from the browser of the client terminal, and transmits the generated screen to the client terminal via the communication unit 303.

Figure 4:
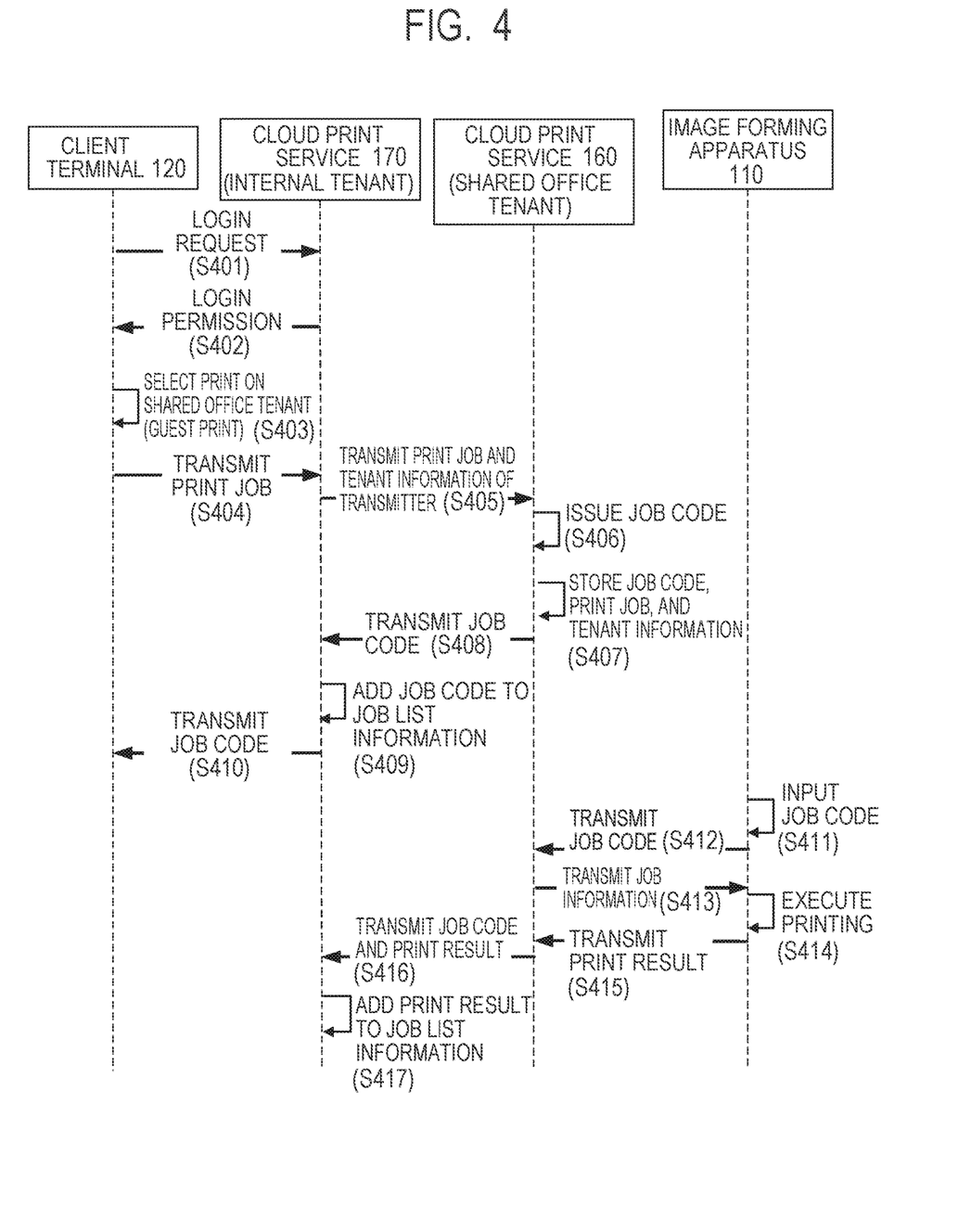
FIG. 4 illustrates a sequence diagram of print job execution processing.

FIG. 4 illustrates a printing sequence diagram in CPS cooperation of the print system. In particular, FIG. 4 illustrates the printing sequence in which the image forming apparatus 110 managed by the CPS 160 prints a document of the client terminal 120 via the CPS 170. FIG. 5 illustrates a tenant selection screen. The control method of the print system will be described below.

In step S401, the client terminal 120 transmits a login request to the CPS 170 according to login information input by the user. A login screen provided by the UI control unit 306 of the CPS 170 is displayed on the client terminal 120, and the client terminal 120 transmits the login information input by the user to the CPS 170. The authentication control unit 304 of the CPS 170 receives the login request via the communication unit 303, queries an authentication service (not shown) for login information, and performs authentication of the user. If the authentication is successful, the authentication control unit 304 advances the processing to step S402. On the other hand, if the authentication fails, the processing of step S401 is repeated.

In step S402, the CPS 170 transmits login permission to the client terminal 120.

In step S403, the client terminal 120 selects a tenant in which the user executes printing. The UI control unit 306 of the CPS 170 displays a tenant selection UI 500 shown in FIG. 5, for example, on the client terminal 120. In response to the operation of the client terminal 120, the user can select a ratio button of the internal tenant 501 or a radio button of the shared office tenant 502 to designate a transmission destination of the print job. In the present embodiment, the internal tenant 501 represents the CPS 170 and the shared office tenant 502 represents the CPS 160.

This sequence will describe a case of the user putting a check mark on the shared office tenant 502. The client terminal 120 selects printing (guest printing) on the share office tenant representing the CPS 160 according to the user's operation.

In step S404, the client terminal 120 transmits the print job and the tenant selection result in step S403 to the CPS 170.

In step S405, the communication unit 303 of the CPS 170 transmits the print job and information of the transmission source tenant (the tenant information for the job transmission source, in this case, the URL of CPS 170) to the CPS 160 indicated by the tenant selection result received from the client terminal 120.

In step S406, the job management unit 302 of the CPS 160 functions as an issuing unit, and when receiving the print job and the information of the transmission source tenant from the CPS 170, the communication unit 303 of the CPS 160 issues a job code corresponding to the print job received from the CPS 170. The job code is a unique value indicating the print job.

In step S407, the job management unit 302 of the CPS 160 functions as a storage unit, and stores the print job, the job code, and the tenant information of the transmission source received from the CPS 170 in the data storage unit 305 of the CPS 160. The tenant information of the transmission source is information indicating the CPS 170. An example of job information stored in the data storage unit 305 of the CPS 160 is shown in Table 1.

TABLE 1

| Job ID | Job name | Creation date | Transmission source | Job code | File path | Print result |
|---|---|---|---|---|---|---|
| YYY001 | fileW.pdf | 2020 Dec. 3 | https://companyA | XXX-XXXX-XXX | /YYY001/fileW.pdf | |

Table 1 is job list information of the CPS 160, and the job list information is a list of job information of the CPS 160. The job information of the CPS 160 includes a job ID, a job name, a creation date, tenant information of transmission source, a job code, a job file path, and a print result. The job ID is a value uniquely indicating a print job in the job list information of the CPS 160. The job name is a display name indicating the print job. The creation date is the date when the print job is created. The tenant information of transmission source is a URL indicating the tenant information (CPS 170) of the print job source. The job code is the value of the job code issued by the CPS 160 corresponding to the print job. The job file path is a file path where the print job transmitted to the CPS 160 is stored. The print result indicates the execution result when the print job is executed by the image forming apparatus. The job information in Table 1 shows, for example, that the job name of the print job received by the CPS 160 is "fileW.pdf" and the URL of the source tenant is "https://companyA".

In step S408, the CPS 160 functions as a transmission unit and transmits the job code to the CPS 170 via the communication unit 303.

In step S409, the job management unit 302 of the CPS 170 stores the received job code as job information in the data storage unit 305 of the CPS 170. An example of the job list information stored in the data storage unit 305 of the CPS 170 is shown in Table 2.

TABLE 2

| Job ID | Job name | Creation date | Job code of destination | Print Result |
|---|---|---|---|---|
| XXX001 | fileX.pdf | 2020 Dec. 1 | — | Success |
| XXX002 | fileY.pdf | 2020 Dec. 3 | — | Failure |
| XXX003 | fileZ.pdf | 2020 Dec. 3 | — | Success |
| XXX004 | fileW.pdf | 2020 Dec. 3 | XXX-XXXX-XXX | |

Table 2 shows job list information of the CPS 170, and the job list information is a list of job information of the CPS 170. The job information of the CPS 170 includes a job ID, a job name, a creation date, a job code of a transmission destination, and a print result. In the example of Table 2, five pieces of job information are stored in the CPS 170, and the job information corresponding to the job ID "XXX004" is stored in the process of step S409. The job ID, job name, creation date, and print result are the same as those described in Table 1. The job code of the transmission destination is the value of the job code issued by the destination tenant (CPS 160). Although not shown in Table 2, the CPS 170 may store the login information (user information) obtained in steps S401 and S 402 in association with the job information.

The job ID "XXX004" in Table 2 and the job ID "YYY001" in Table 1 indicate the same job, and Table 1 indicates that the print job is a print job transmitted from the tenant of the CPS 170.

In step S410, the CPS 170 transmits the job code to the client terminal 120. The client terminal 120 receives the job code and completes the processing.

Next, the user performs a printing operation in the image forming apparatus 110. In step S411, the image forming apparatus 110 inputs the job code received in step S410 in response to the user's operation.

In step S412, the image forming apparatus 110 transmits the input job code to the communication unit 303 of the CPS 160.

In step S413, the job management unit 302 of the CPS 160 acquires the job information corresponding to the job code received by the communication unit 303 of the CPS 160 from the data storage unit 305 in response to (the request of) the job code from the image forming apparatus 110. The job management unit 302 of the CPS 160 functions as a transmission unit and transmits the job information to the image forming apparatus 110. The job information includes the print job. For example, if the job code input in step S411 is "XXX-XXXX-XXXX" and the job information stored in the data storage unit 305 is an example of Table 1, the job information of the job ID "YYY001" indicates the print job.

In step S414, the image forming apparatus 110 receives the job information and executes printing of the print job.

In step S415, the image forming apparatus 110 transmits the information of the execution result of the print job to the CPS 160. The communication unit 303 of the CPS 160 functions as a reception unit, and receives the information of the execution result of the print job transmitted by the image forming apparatus 110 from the image forming apparatus 110. The job management unit 302 of the CPS 160 stores the information of the execution result of the print job received by the communication unit 303 of the CPS 160 in the data storage unit 305 of the CPS 160. As a result, "Success" is stored in the print result of Table 1.

In step S416, the CPS 160 functions as a transmission unit, and transmits the job code and the information of the execution result of the print job to the CPS 170 via the communication unit 303 using the tenant information of the transmission source of Table 1 stored in the data storage unit 305. The job management unit 302 of the CPS 170 stores the information of the execution result of the print job corresponding to the job code received by the communication unit 303 of the CPS 170 in the data storage unit 305. As a result, "Success" is stored in the print result of the job ID "XXX004" in Table 2.

In the present embodiment, the control method of the print system relating to the execution of a print job transmitted from an internal tenant to a shared office tenant has been described. According to the present embodiment, the internal tenant can manage the number of copies, the billing information, the history, and the like with respect to the print job executed in the shared office tenant.

Second Embodiment

In the second embodiment, an example of a control method of a print system with enhanced security will be described with reference to FIG. 6. The configuration and processing which are not particularly specified are all the same as those of the first embodiment.

Figure 6:
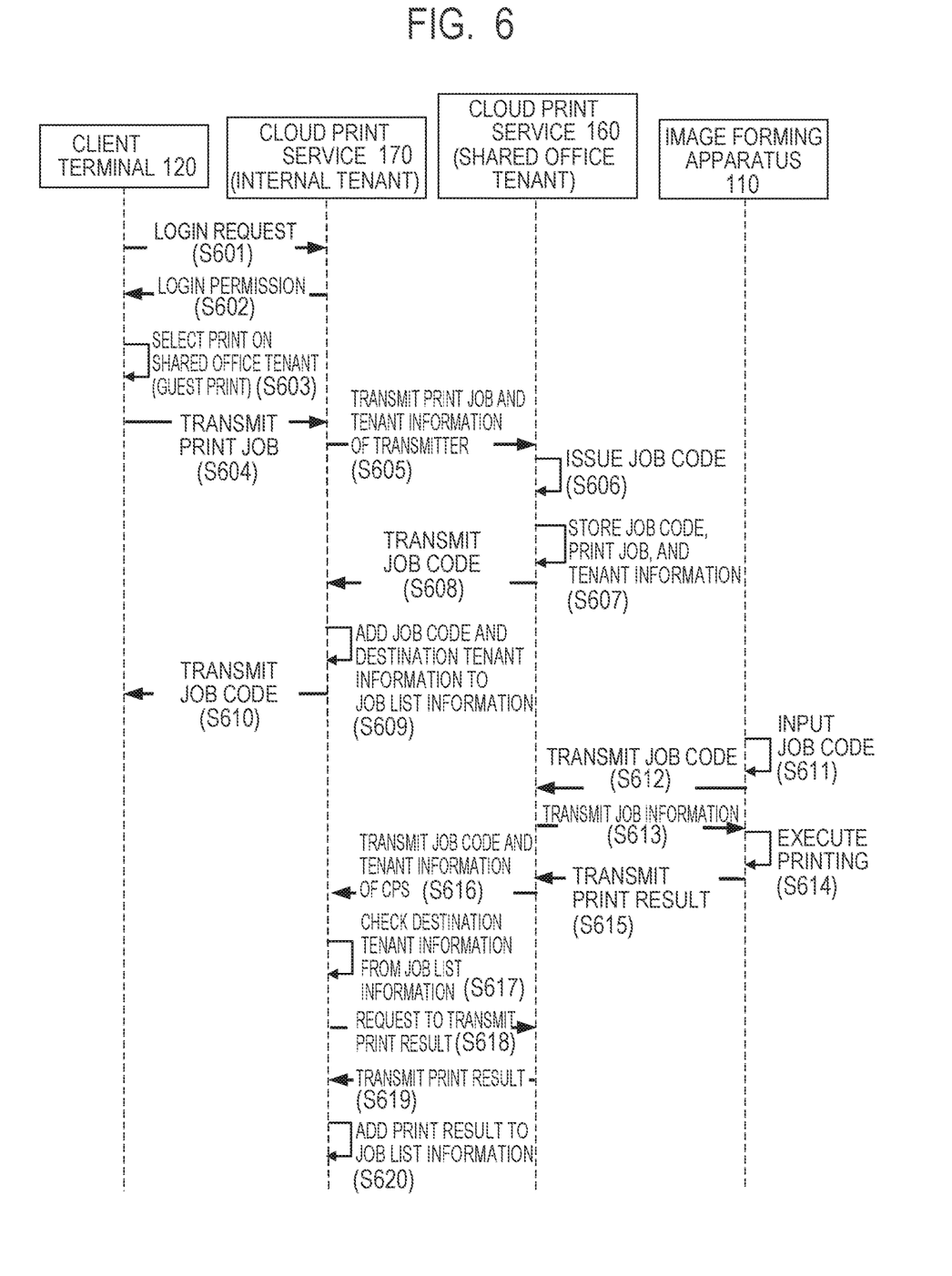
FIG. 6 illustrates a sequence diagram of the print job execution processing.

FIG. 6 illustrates a printing sequence diagram in CPS cooperation of the print system according to the second embodiment. Similar to FIG. 4, FIG. 6 illustrates the printing sequence in which the image forming apparatus 110 managed by the CPS 160 prints a document of the client terminal 120 via the CPS 170.

In steps S601 to S610, the client terminal 120 transmits the print job to the CPS 160 via the CPS 170, and the CPS 170 transmits the job code to the client terminal 120 after the CPS 160 issues the job code. The processes in steps S601 to S610 are the same as those in steps S401 to S410 in FIG. 4. However, in step S609, the job management unit 302 of the CPS 170 stores the received job code and the destination tenant information as job information in the data storage unit 305 of the CPS 170. An example of the job list information stored in the data storage unit 305 of the CPS 170 is shown in Table 3.

TABLE 3

| Job ID | Job name | Creation date | Tenant information of destination | Job code of destination | Print Result |
|---|---|---|---|---|---|
| XXX001 | fileX.pdf | 2020 Dec. 1 | | — | Success |
| XXX002 | fileY.pdf | 2020 Dec. 3 | | — | Failure |
| XXX003 | fileZ.pdf | 2020 Dec. 3 | | — | Success |
| XXX004 | fileW.pdf | 2020 Dec. 3 | https://shareOfficeB | XXX-XXXX-XXX | |

In Table 3, the tenant information of the destination is added to job information as compared to Table 2. The tenant information of the destination indicates the URL of the destination tenant when transmitted from the CPS 170 to CPS 160. The job ID "XXX004" in Table 3 and the job ID "YYY001" in Table 1 indicate the same print job. In Table 1, it can be seen that the print job was transmitted from the tenant of the CPS 170 based on the job information. In Table 3, since the tenant information of the destination is added to the job information, it is known that the print job is a print job transmitted to the CPS 160 ("https://shareOfficeB").

In steps S611 to S615, the user performs a printing operation in the image forming apparatus 110 managed by the CPS 160 located in the shared office. The processes in steps S611 to S615 are same as the processes in steps S411 to S415 in FIG. 4.

In step S616, the CPS 160 functions as a transmission unit and transmits the job code and tenant information (URL "https://shareOfficeB") of the CPS 160 to the CPS 170 via the communication unit 303. The tenant information of the CPS 160 is information indicating the CPS 160.

In step S617, the job management unit 302 of the CPS 170 retrieves the job information corresponding to the job code received by the communication unit 303 of the CPS 170, and compares the tenant information of the transmission destination of the job information with the corresponding tenant information received by the communication unit 303. For example, the job management unit 302 retrieves the tenant information of the print job destination "https://shareOfficeB" corresponding to the job code "XXX-XXXX-XXXX" from the job information shown in Table 3. Next, the job management unit 302 compares the retrieved tenant information of the destination "https://shareOfficeB" with the tenant information (URL "https://shareOfficeB") received in step S616.

In step S618, if the retrieved tenant information of the destination matches the received tenant information, the job management unit 302 of the CPS 170 transmits a request for transmitting information of the execution result of the print job to the CPS 160 indicated by the tenant information via the communication unit 303 of the CPS 170.

In step S619, the CPS 160 functions as a transmission unit after the transmission in step S616, and transmits the information of the execution result of the print job of the image forming apparatus 110 to the CPS 170 when receiving the request for transmitting the information of the execution result of the print job via the communication unit 303.

In step S620, as in step S417 in FIG. 4, the job management unit 302 of the CPS 170 stores the information of the execution result received by the communication unit 303 of the CPS 170 in the data storage unit 305 of the CPS 170 as the print result of the corresponding job information.

The CPS 170 can store a list of tenant information (trusted tenant information list) with respect to the CPS with which a trust relationship has been established in advance (not shown). In this case, the CPS 170 may check whether or not the relevant tenant information is included in the trusted tenant information list in the processing of step S617. The CPS 170 cannot be spoofed if the CPS 170 is a tenant with whom a trust relationship has been established in advance.

In the second embodiment, an example of a method in which an internal tenant obtains information of the execution result of a print job from a shared office tenant has been described. According to the present embodiment, the internal tenant can reduce the risk of unauthorized access due to spoofing and improve the security as compared with the first embodiment by transmitting the request for transmitting the information of the execution result of the print job to the shared office tenant.

According to the present disclosure, when the cloud print system transmits the information of the execution result of the print job to other cloud print system, the information of the execution result of the print job can be managed by other cloud print system.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-145381, filed Sep. 7, 2021, which is hereby incorporated by reference herein in its entirety.

What is claimed is:

1. A cloud print system connected to an image forming apparatus via a network comprising:
   one or more memories storing a set of instructions; and
   one or more processors that execute the set of instructions to:
      receive a print job from other cloud print system when the other cloud print system transmits the print job which is received from a user terminal;
      issue a job code corresponding to the print job in response to receiving the print job from the other cloud print system;
      store the received print job, the issued job code, and information indicating the other cloud print system in association with each other;
      transmit the issued job code to the other cloud print system for causing the other cloud print system to notify the user terminal of the transmitted job code, wherein the other cloud print system further stores the transmitted job code in association with information of the print job;
      transmit, when the cloud print system receives a request from the image forming apparatus, the stored print job corresponding to the job code included in the received request to the image forming apparatus;
      receive information of an execution result of the transmitted print job from the image forming apparatus; and
      transmit both the received information of the execution result and the stored job code to the other cloud print system indicated by the stored information for causing the other cloud print system to manage the transmitted information of the execution result on the other cloud print system as an execution result of the print job corresponding to the transmitted job code.

2. The cloud print system according to claim 1, wherein the one or more processors further execute the set of instructions to transmit both the received information of the execution result and the stored job code to the other cloud print service indicated by the stored information in response to a request from the other cloud print system.

3. The cloud print system according to claim 1, wherein the one or more processors further execute the set of instructions to:

transmit the stored job code to the other cloud print system after receiving the information of the execution result of the print job; and transmit the received information of the execution result to the other cloud print system in response to receiving a request from the other cloud print system after transmitting the stored job code to the other cloud print system.

4. A method for controlling a cloud print system connected to an image forming apparatus via a network comprising:

receiving a print job from other cloud print system when the other cloud print system transmits the print job which is received from a user terminal;

issuing a job code corresponding to the print job in response to receiving the print job from the other cloud print system;

storing the received print job, the issued job code, and information indicating the other cloud print system in association with each other;

transmitting the issued job code to the other cloud print system for causing the other cloud print system to notify the user terminal of the transmitted job code, wherein the other cloud print system further stores the transmitted job code in association with information of the print job;

transmitting, when the cloud print system receives a request from the image forming apparatus, the stored print job corresponding to the job code included in the received request to the image forming apparatus;

receiving information of an execution result of the transmitted print job from the image forming apparatus; and transmitting both the received information of the execution result and the stored job code to the other cloud print system indicated by the stored information for causing the other cloud print system to manage the transmitted information of the execution result on the other cloud print system as an execution result of the print job corresponding to the transmitted job code.

* * * * *